July 17, 1923.
J. A. CARLSON
1,461,890
EMERGENCY FUEL TANK FOR AUTOMOBILES
Filed April 5, 1920
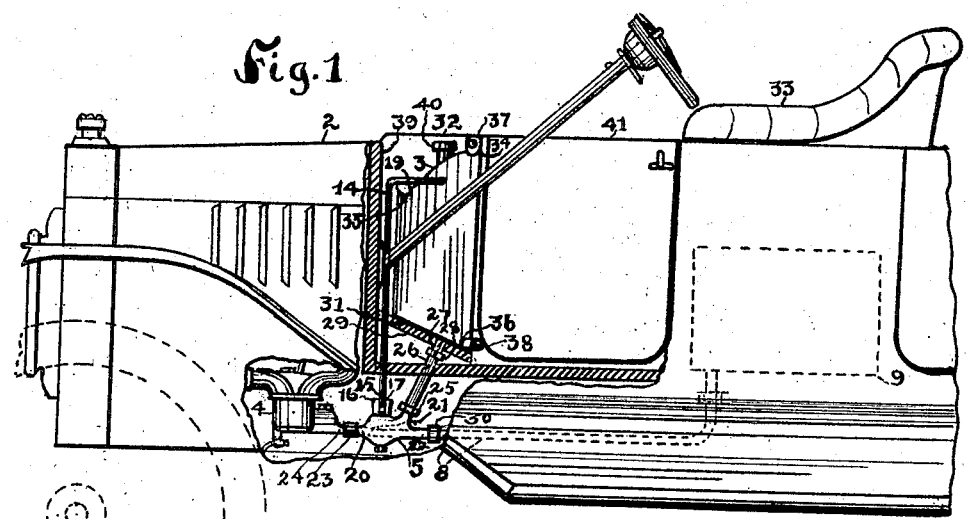
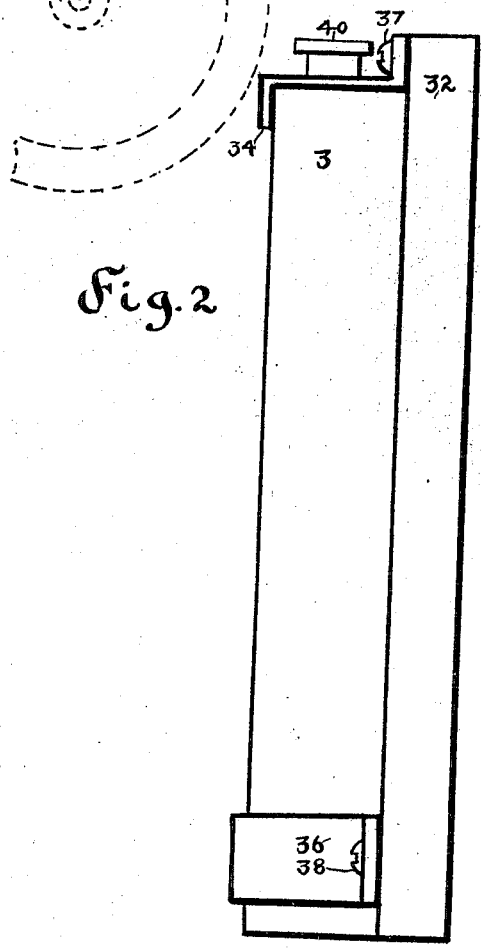
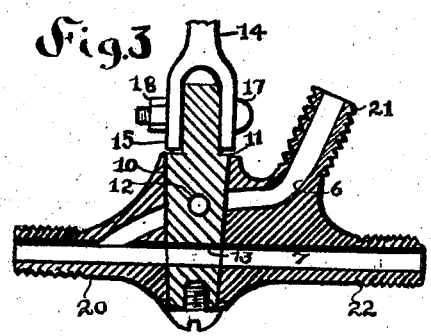
INVENTOR.
Jalmar A. Carlson
ATTORNEY Patented July 17, 1923.

1,461,890

UNITED STATES PATENT OFFICE.

JALMAR ALEX CARLSON, OF STAMBAUGH, MICHIGAN.

EMERGENCY FUEL TANK FOR AUTOMOBILES.

Application filed April 5, 1920. Serial No. 371,520.

*To all whom it may concern:*

Be it known that I, JALMAR A. CARLSON, a citizen of the United States, residing at Stambaugh, Iron County, Michigan, have invented certain new and useful Improvements in Emergency Fuel Tanks for Automobiles, of which the following is a specification.

My invention relates to automobiles and has particular reference to improvements in the form, emplacement, arrangement and operation of auxiliary fuel tanks provided to prevent the stalling of such vehicles during hill-climbing caused by the gasoline level in the supply tank falling below the level of the carbureter.

The objects of the present improvement are to provide an auxiliary tank installation that will substantially overcome the general objections thereto, such as their either taking up space where they are in the way, or where they are liable to be exploded by the heat of the engine; to provide simple and comparatively inexpensive means for connecting the auxiliary tank with the existing arrangements of feed pipes, and to operate the control of flow from both main feed pipe and auxiliary feed pipe by the same means and so that when one of said feed pipes is opened to the carbureter the other is automatically closed.

With the above named objects in view this invention consists in the novel construction, combination and arrangement of parts hereinafter described in detail, illustrated in the accompanying drawing, and more particularly pointed out in the appended claim.

In the drawing—

Figure 1 is a side elevation of the front section of an automobile tonneau or body, partly broken away and partly in dotted lines.

Figure 2 is an enlarged view of the rear edge of the auxiliary tank and the panel of the frame which forms the front end of the right hand side of the car body and to which said auxiliary tank is attached.

Figure 3 is an enlarged vertical and longitudinal section of the feed pipe fitting and double control valve for both main and auxiliary feed pipes.

In the several views 2 represents the front portion of the body of an automobile with the left hand door at the driver's seat omitted and parts below and in front of said door being broken away to disclose the right hand side to which the auxiliary tank is attached together with its connections. The auxiliary tank is a thin tank 3 about two and one-half inches in thickness, or with a projection into the car beyond the front frame of the side of only about three-fourths of an inch. The auxiliary tank 3 is connected with the carbureter —4—, which in popular and in large numbers of existing cars is substantially as close to the position of my auxiliary tank as indicated in Figure 1. This connection is effected with the aid of a valve and pipe fitting 5 having therein a passage 6 which leads from the auxiliary tank to a similar passage 7 which is made a part of the usual main feed pipe —8— that leads from the usual tank 9 shown by dotted lines in Figure 1 as under the operator's seat, but the specific position of which is immaterial so far as the present invention is concerned. Through the fitting 5 extends a vertical and tapered valve bore 10 in which is seated a valve plug 11 which intersects the passages 6 and 7 and has a transverse bore or port 12 therethrough that is rotatable to register with the passage 6. In said valve plug is also a similar bore 13 arranged at right angles to the bore 12 and similarly rotatable to open or close the passage 7. This double valve is operated by means of a rod 14 on the lower end of which is a fork 15 that is engaged with a lug 16 on the valve plug 11 and secured to the latter by means of a bolt and nut 17 and 18, a bolt hole being made through the lug and the branches of the fork for said bolt. This rod passes through a suitable opening in the floor of the car close to the front thereof and has its upper end bent at right angles to form a handle 19 in front of the operator's or chauffeur's position.

The fitting 5, shown on an enlarged scale in Figure 3, has three threaded pipe branches 20, 21 and 22 adapted to be joined to ordinary pipe unions, the details of which are not involved herein, any acceptable form of pipe union, or coupling connection with said branches 20, 21 and 22, being available to carry out the present invention. As shown the passages 6 and 7 unite within the branch 20 and said branch is connected by means of any suitable coupling member or union member 23 to the usual pipe connection or nipple 24 of the carbureter 4. The branch 21 is connected by means of a similar coupling member 25 with a short pipe 26 the upper end of which is connected with a coupler 28 also connected with an outlet branch 27 in the bottom of the auxiliary tank 3, a suitable bore being made through the footboard —29— and floor of the car for this purpose. The coupling for the branch 22 is labeled 30 and connects the main supply pipe 8 with the fitting 5.

The auxiliary tank 3 has an inclined bottom 31 arranged in conformity with the inclination of the foot-board 29 upon which said tank 3 is vertically supported as shown in Figure 1. Said tank 3 is secured against lateral movement on the foot-board by several simple clamps or brackets to the front side panel of the car, which panel is indicated by the numeral 32. 33 is the driver's seat. These brackets are, as shown in Figure 2, plain straps of metal the respective ends of which are bent in opposite directions at right angles to their bodies to form lugs which engage the side of the tank, and lugs to be engaged by fastening bolts or screws. Two such brackets 34 and 35 are engaged with the upper portion of the tank and may be fastened by bolts already to be found at their indicated positions in Figure 1 on many existing cars. A similar lower bracket 36 is engaged with the rear edge of the tank 3, the upper brackets being shown fastened by screws 37 and the lower one by a similar screw 38 engaged with the panel 32. The handle portion 19 of the valve-operating rod 14 may be arranged to normally lie against the front 39 of the car body and to be projected as in Figure 1 only when the emergency fuel passage is open. In closing the latter the regular fuel passage is opened automatically, or in the same movement, which obviates separate attention on said regular passage. Likewise when the emergency passage from the tank 3 is opened the regular passage is automatically closed to prevent a rearward flow from the tank 3 toward the tank 9 when traveling up grade. The tank 3 is provided with the usual capped inlet 41 and is conveniently accessible, being immediately in front of the car door 41.

The above described improvement may be installed in and connected with existing cars without any alterations therein aside from the simple openings through the floor and insertion of the fitting 5 in the regular fuel conduit, all requiring, perhaps, less than an hour's work. The space occupied by the tank 3 does not appreciably encroach upon needed room within the car. The upper edge of the tank 3 is shown with an approximately S curve to make this part of the tank conform to the similar curvature toward the front wall of the side wall in many of existing cars.

I claim as my invention—

The combination with an automobile body and its main tank and carbureter, of an auxiliary tank mounted in front of the door at one side of said body and on the foot-board, each said tanks having a pipe leading therefrom, a valve fitting in which the conduits of said pipes meet, and a single valve controlling both of said conduits, said single valve having a valve-stem with a handle thereon in front of the driver in his seat in said automobile.

In testimony whereof I have hereunto subscribed my name.

JALMAR ALEX CARLSON.